United States Patent
Kiesewetter

(10) Patent No.: US 8,962,714 B2
(45) Date of Patent: Feb. 24, 2015

(54) HYDRAULIC SETTING ADHESIVE WITH IMPROVED OPEN TIME

(75) Inventor: Rene Kiesewetter, Wietzendorf (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/127,251

(22) PCT Filed: Jun. 19, 2012

(86) PCT No.: PCT/US2012/043045
§ 371 (c)(1),
(2), (4) Date: Dec. 18, 2013

(87) PCT Pub. No.: WO2013/003104
PCT Pub. Date: Jan. 3, 2013

(65) Prior Publication Data
US 2014/0135429 A1    May 15, 2014

Related U.S. Application Data

(60) Provisional application No. 61/502,959, filed on Jun. 30, 2011.

(51) Int. Cl.
| | | |
|---|---|---|
| C04B 24/26 | (2006.01) | |
| C04B 16/02 | (2006.01) | |
| C04B 7/00 | (2006.01) | |
| C04B 24/16 | (2006.01) | |
| C04B 20/10 | (2006.01) | |
| C04B 28/02 | (2006.01) | |
| C04B 28/04 | (2006.01) | |
| C04B 103/00 | (2006.01) | |
| C04B 103/40 | (2006.01) | |
| C04B 111/00 | (2006.01) | |

(52) U.S. Cl.
CPC .............. C04B 24/16 (2013.01); C04B 20/1022 (2013.01); C04B 28/02 (2013.01); C04B 28/04 (2013.01); C04B 2103/0057 (2013.01); C04B 2103/40 (2013.01); C04B 2111/00689 (2013.01)
USPC ................. 524/5; 406/809; 406/805; 406/804

(58) Field of Classification Search
CPC .... C04B 20/1022; C04B 24/16; C04B 28/02; C04B 28/04; C04B 24/38; C04B 24/383; C04B 28/06; C04B 24/2623; C04B 40/0028; C04B 2103/0057; C04B 2103/40; C04B 2111/00689; C04B 2103/46
USPC ................. 524/5; 106/809, 805, 804
See application file for complete search history.

(56) References Cited

U.S. PATENT DOCUMENTS

| | | |
|---|---|---|
| 3,960,584 A | 6/1976 | Savage |
| 5,959,017 A | 9/1999 | Eck et al. |
| 7,740,701 B2 | 6/2010 | Waser |
| 8,461,247 B2 | 6/2013 | Willimann et al. |
| 2004/0044103 A1 | 3/2004 | Rooshenas |
| 2006/0169183 A1 | 8/2006 | Waser |
| 2008/0196629 A1 | 8/2008 | Yamakawa et al. |

FOREIGN PATENT DOCUMENTS

| | | |
|---|---|---|
| DE | 19535833 A1 | 3/1997 |
| DE | 102005012986 A1 | 9/2006 |
| EP | 295628 A2 | 12/1988 |
| EP | 1048676 A2 | 11/2000 |
| EP | 1686103 A2 | 8/2006 |
| EP | 1964826 A2 | 9/2008 |
| GB | 1 484 057 * | 8/1977 |
| GB | 1484057 A | 8/1977 |
| JP | 3257046 A | 11/1991 |
| JP | 2000128617 A | 5/2000 |
| JP | 2001019513 A | 1/2001 |
| WO | 03048070 A1 | 6/2003 |
| WO | 2004033387 A1 | 4/2004 |
| WO | 2009156164 A1 | 12/2009 |

OTHER PUBLICATIONS

Silaghi et al., "Influence of MHEC and HPC Additives on the Properties of Cement Based Mortar," Materiale de Constructii, vol. XXIX, No. 4, 1999, pp. 2-5.

* cited by examiner

*Primary Examiner* — William Cheung
(74) *Attorney, Agent, or Firm* — Andrew E. C. Merriam

(57) ABSTRACT

A hydraulic setting adhesive containing a hydraulic binder, fillers, a water retention agent, a sulfoalkylester surfactant, and optionally a redispersible polymer powder and/or a polymer dispersion, wherein the surfactant is represented by the formula of $MSO_3—R^1—(—COOR^2)_n$, wherein M is selected from the group consisting of hydrogen, alkali metals, alkaline earth metals, and ammonium; $R^1$ is linear or branched, saturated or unsaturated $C_1$-$C_{10}$ alkylene that optionally can be substituted by one or more hydroxyl, halogen, nitro or cyano groups; $R^2$ can be identical or different from $R^1$ and is represented by $C_1$-$C_{22}$ linear or branched alkyl; and n is an integer from 1 to 10, and wherein the hydraulic setting adhesive based on its dry weight comprises 0.1-3% by weight of the water retention agent.

8 Claims, No Drawings

HYDRAULIC SETTING ADHESIVE WITH IMPROVED OPEN TIME

This application is a U.S. national stage application under 35 U.S.C. 371 of international Application No. PCT/US12/43045 filed Jun. 19, 2012, which claims the benefit of U.S. Provisional Application No. 61/502,959, filed Jun. 30, 2011.

FIELD OF THE INVENTION

The present invention relates to a hydraulic-setting adhesive with improved open time in construction applications. Particularly, the present invention relates to a hydraulic-setting adhesive comprising a surfactant sulfoalkylester or its salt and manufacturing processes therefor.

DISCUSSION OF BACKGROUND INFORMATION

Hydraulic-setting adhesives are widely used in the construction industry. For example they can be used as adhesives for adhering ceramic tiles. The adhesives mainly contain inorganic hydraulic-setting binder, such as cements, and fillers, such as quartz and/or carbonate-containing raw materials. Such hydraulic-setting adhesives can be provided in the form of a polymer-containing mortar composition, into which additives can be added for improving the technical and physical properties of an adhesive. For example, a water retention agent, particularly cellulose ethers, can be added into such a hydraulic setting adhesive to improve thickening(consistency) and increase their water retention capacity.

Long open time and short setting time are desired as important properties in evaluating workability of a hydraulic setting adhesive as an adhesive in construction industry. In the prior art, different retarders are used to improve open time of a hydraulic setting adhesive.

JP2000128617 teaches a composition that contains hydroxypropylmethyl cellulose, seaweed-derived water-soluble polymers, and/or set retarders. Such polymers include carrageenan, alginic acid, sodium alginate, etc. Hydroxybenzene, phenolic acid, carboxylic acid, oxycarboxylic acid, aminocarboxylic acid, their salts, silicofluoride, phosphate, borate, etc., may be added as a setting retarder. The composition has a long open time and can be applied onto large areas in one batch.

US20060169183A1 teaches a hydraulically setting mortar composition containing at least one cellulose ether and at least one setting retarder which might be polyhydroxy compounds, phosphates, water-soluble silicofluorides, boric acid and salt thereof, carboxylic acids and salts thereof, carboxyl group-containing polymers, etc.

US20080196629A1 teaches a self-leveling composition containing cement, fillers, water-reducing agents, defoamers and a setting retarder that can be hydroxycarboxylic acids, such as gluconic acid, citric acid and glucoheptonic acid, inorganic salts thereof, sacchardies, and boric acid.

The prior-art adhesive compositions as mentioned above achieves a long open time with the help of retarders, but at the same time the retarders lead to a significant delay in hydraulic setting kinetics. Such impact on setting brings economic drawbacks due to a delayed construction progress. Other disadvantages include changed water loads and low adhesion strength.

The present inventors have sought to solve the problem of providing a hydraulic-setting adhesive to achieve a long open time without deteriorating other properties, especially setting time.

STATEMENT OF THE INVENTION

In accordance with the present invention, hydraulic setting adhesives comprise hydraulic binder, fillers, a water retention agent, and a sulfoalkylester surfactant, wherein the surfactant is represented by the following formula:

$$MSO_3—R^1—(—COOR^2)_n,$$

wherein M is selected from the group consisting of hydrogen, alkali metals, alkaline earth metals, and ammonium;

$R^1$ is linear or branched, saturated or unsaturated $C_1$-$C_{10}$ alkylene that can be substituted by one or more hydroxyl, halogen, nitro or cyano groups;

$R^2$ can be identical or different from $R^1$ when n>=2, and is represented by a $C_1$-$C_{22}$ linear or branched alkyl radical; and n is an integer from 1 to 10.

Preferably, the present invention provides a hydraulic setting adhesive comprising hydraulic binder, one or more fillers, cellulose ether, one or more redispersible polymer powders and/or polymer dispersions and sulfoalkylesters, wherein said hydraulic setting adhesive comprises 0.15% to 1.5% by weight of methyl hydroxypropyl cellulose ether, and 0.02% to 0.4% by weight of sodium 1,4-bis(2-ethylhexoxy)-1,4-dioxobutane-2-sulfonate based on the total dry weight of the hydraulic setting adhesive.

In another aspect, the invention provides processes for preparing the hydraulic setting adhesive of the present invention comprising classifying the ingredients into dry ingredients and liquid ingredients, formulating the sulfoalkylester surfactant into a solution and applying the solution on the cellulose ether to form a treated cellulose ether, mixing the treated cellulose ether with the other dry ingredients, and combining the dry ingredients and the liquid ingredients directly before mixing together with water.

DETAILED DESCRIPTION OF THE PRESENT INVENTION

As used herein:

Unless otherwise stated, all percentages (%) are by weight based on the total dry weight of the hydraulic setting adhesive. The descriptions of the various ingredients set forth below are non-limiting. "EN" stands for European Norm and designates a test method as a prefix to the test method number. The test method is the most current test method as of the priority date of this document.

As used herein, the term "hydraulic setting adhesive" means a composition used in the construction field comprising a hydraulic binder, fillers and polymer-containing additives, such as a water retention agent, polymer dispersion and/or redispersible polymer powder.

The hydraulic setting adhesive of the present invention includes a sulfoalkylester surfactant having the following formula:

$$MSO_3—R^1—(—COOR^2)_n,$$

wherein M is selected from the group consisting of hydrogen, alkali metals, alkaline earth metals, and ammonium;

$R^1$ is linear or branched, saturated or unsaturated $C_1$-$C_{10}$ alkylene that optionally can be substituted by one or more hydroxyl, halogen, nitro or cyano groups;

$R^2$ can be identical or different from $R^1$, and is represented by $C_1$-$C_{22}$ linear or branched alkyl; and n is an integer from 1 to 10.

Preferably in the above formula, n=2 and the surfactant is a dialkylester sulfonate. More preferably, $R^1$ is $C_2$-$C_4$ alkylene, $R^2$ is $C_2$-$C_8$ alkyl and n=2, and thus the surfactant is a dialkylester sulfonate having shorter aliphatic chains. Even more preferably, the surfactant is a dioctyl sulfosuccinate salt, such as sodium dioctyl sulfosuccinate, i.e. sodium 1,4-bis(2-ethylhexoxy)-1,4-dioxobutane-2-sulfonate.

The inventive hydraulic setting adhesive typically comprises 0.01% or more and can comprise 0.02% or more, even 0.06% or more, even 0.1% or more and at the same time typically comprises 2% or less, and can comprise 0.4% or less, even 0.3% or less, even 0.2% or less by weight of the sulfoalkylester surfactant based on the total dry weight of the hydraulic setting adhesive.

A water retention agent is widely used in a traditional mortar to control the rate of water removal therefrom, since the physical characteristics of a hardened traditional mortar are strongly influenced by the mortar hydration process.

Cellulose ether, starch ether or a mixture of both can be used as a water retention agent in the inventive hydraulic setting adhesive. Preferably, cellulose ethers are water-soluble and/or organo-soluble, ionic or nonionic cellulose derivatives.

The cellulose ethers used in the present invention could be one or more selected from the group consisting of hydroxyalkylcelluloses (e.g., hydroxyethylcellulose (HEC), hydroxypropylcellulose (HPC) and hydroxypropylhydroxyethylcellulose (HPHEC)), carboxy-alkylcelluloses (e.g., carboxymethylcellulose (CMC)), carboxyalkylhydroxyalkylcelluloses (e.g., carboxymethylhydroxyethylcellulose (CMHEC), carboxymethyl-hydroxypropylcellulose (CMHPC)), sulphoalkylcelluloses (e.g., sulphoethylcellulose (SEC), sulphopropylcellulose (SPC)), carboxyalkylsulphoalkylcelluloses (e.g., carboxymethylsulphoethylcellulose (CMSEC), carboxymethylsulphopropylcellulose (CMSPC)), hydroxyalkylsulphoalkylcelluloses (e.g., hydroxyethylsulphoethyl cellulose (HESEC), hydroxypropylsulphoethylcellulose (HPSEC) and hydroxyethylhydroxypropylsulphoethyl cellulose (HEHPSEC)), alkylhydroxyalkylsulphoalkyl celluloses (e.g., methylhydroxyethylsulphoethyl cellulose (MHESEC), methylhydroxypropylsulphoethylcellulose (MHPSEC) and methylhydroxyethylhydroxypropylsulphoethylcellulose (MHEHPSEC)), alkylcelluloses (e.g., methylcellulose (MC), ethylcellulose (EC)), binary or ternary alkylhydroxyalkylcellulose (e.g., hydroxyethylmethylcellulose (HEMC), ethylhydroxyethylcellulose (EHEC), hydroxypropylmethylcellulose (HPMC), ethylhydroxypropylcellulose (EHPC), ethylmethylhydroxyethylcellulose (EMHEC), and ethylmethylhydroxypropylcellulose (EMHPC)), alkenylcelluloses and ionic and nonionic alkenylcellulose mixed ethers (e.g., allylcellulose, allylmethylcellulose, allylethylcellulose and carboxy-methylallylcellulose)), dialkylaminoalkylcelluloses (e.g., N,N-dimethylaminoethylcellulose, N,N-diethylaminoethylcellulose), dialkylaminoalkylhydroxyalkylcelluloses (e.g., N,N-dimethylaminoethylhydroxyethyl cellulose and N,N-dimethylaminoethylhydroxypropylcellulose), aryl-, arylalkyl- and arylhydroxyalkylcelluloses (e.g., benzylcellulose, methylbenzylcellulose and benzylhydroxyethylcellulose), as well as salts thereof (e.g., sodium carboxymethyl cellulose ether) and reaction products of the above-stated cellulose ethers with hydrophobically modified glycidyl ethers, which have alkyl residues with $C_3$ to $C_{15}$ carbon atoms or arylalkyl residues with $C_7$ to $C_{15}$ carbon atoms. Microbially produced polysaccharides, such as gum and Welan extraction, isolated naturally occurring polysaccharides (hydrocolloids), such as alginates, xanthan, carrageenan, and galactomannans, may also be used alone or as blends with cellulose ethers as water retention agents in the present invention.

The inventive hydraulic setting adhesive typically comprises 0.1% or more and can comprise 0.15% or more, even 0.2% or more and at the same time typically comprises 3% or less, and can comprise 1.5% or less, even 1% or less by weight of cellulose ether based on the total dry weight of the hydraulic setting adhesive.

"Hydraulic binder" is a mineral composition, normally of finely ground materials, which upon addition of an appropriate quantity of water forms a binding paste or slurry capable of hardening of hydration in air as well as under water and binds together the granulates. Preferably, the hydraulic binder used in the present invention is cement. More preferably, the hydraulic binder of the present invention consist of Portland cement, in particular the types of CEM I, II, III, IV and V, and/or alumina cement (aluminate cement).

The inventive hydraulic setting adhesive typically comprises 5% or more and can comprise 10% or more, even 20% or more and at the same time typically comprises 70% or less, and can comprise 50% or less, even 45% or less by weight of the hydraulic binder based on the total dry weight of the hydraulic setting adhesive.

Fillers used in the inventive hydraulic setting adhesive can be selected from the group consisting of silica sand, limestone, chalk, marble, clay, clay, alumina, talc, barite, hollow microspheres, glass and aluminum silicates such as expanded clay, expanded glass and porous fillers based on natural minerals such as foam, pumice and volcanic cinder, and bulking vermiculite.

The inventive hydraulic setting adhesive typically comprises 1% or more and can comprise 50% or more, even 60% or more and at the same time typically comprises 85% or less, and can comprise 70% or less, even 65% or less by weight of the fillers based on the total dry weight of the hydraulic setting adhesive.

Redispersible power (RDP) may be used as a polymeric binder in a hydraulic setting adhesive. RDP may be made by spray drying emulsion polymer in the presence of various additives such as a protective colloid and anti-caking agent. Preferably, such polymeric binders are homopolymers, copolymers or terpolymers of one or more monomers selected from the group consisting of styrene, butadiene, vinyl acetate, versatate, propionate, laurate, vinyl chloride, vinylidene chloride, ethylene, and acrylates, e.g., ethylene/vinylacetate copolymer (vinyl ester-ethylene copolymer), vinylacetate/vinyl-versatate copolymer, and styrene/acrylic copolymer. More preferably, the RDP is copolymer based on vinyl acetate-ethylene, such as DLP 2000 (available from Dow Wolff Cellulosics, Germany). When mixed with water, the redispersible powders can be re-dispersed to form an emulsion, which in turn forms continuous films within a hydraulic setting adhesive later when the water is removed by evaporation and hydration of cement.

A polymer dispersion could also be used to introduce a polymeric binder into the hydraulic setting adhesive of the present invention, which is a two phase system having finely dispersed polymeric particles in solvent, such as water. The polymer dispersion normally comprises polymeric particles as a polymeric binder, such as vinyl polymer or polyacrylic ester copolymer, and a surfactant containing hydrophobic and hydrophilic moieties. The finely dispersed polymer particles will coalesce and form a polymer film while water evaporates.

The use of such polymeric binders is not mandatory, but optional. EN12004 and EN12002 give performance standards regarding a hydraulic setting adhesive containing a polymeric binder. The inventive hydraulic setting adhesive typically comprises 0.3% or more and can comprise 0.5% or more, and at the same time typically comprises 50% or less, and can comprise 10% or less, even 5% or less by weight of redispersible polymer powder and/or the polymer dispersion as solids, based on the total dry weight of the hydraulic setting adhesive.

Besides mixing water, other additives could also be used in the inventive hydraulic setting adhesive, such as, for example, accelerators, retardants, synthetic thickeners, dispersants, pigments, reducing agents, defoamers, air entraining agents, and polymeric superplasticizers. The inventive hydraulic setting adhesive typically comprises 0.001% or more, and at the same time typically comprises 5% or less by weight of these additives based on the total dry weight of the hydraulic setting adhesive.

The inventive hydraulic setting adhesive can be prepared by conventional methods, such as those of EN1346 and EN1348. Preferably, the powdered ingredients of the hydraulic setting adhesive, such as cement, fillers, redispersible polymer powder (if any), and cellulose ether, are homogeneously mixed and then liquid ingredients, such as polymer dispersion (if any), water, etc., are added.

To ensure a homogeneous distribution in the hydraulic setting adhesive the sulfoalkylester surfactant can be directly added to the liquid ingredient, such as the mixing water, and/or part of an aqueous solution.

Preferably, the sulfoalkylester surfactant is applied (such as by spraying) on the water retention agent and then added into the dry ingredients of the hydraulic setting adhesive in a solid form. For example, a dry powder mixture of the surfactant dioctyl sodium sulfosuccinate and methylhydroxyethyl cellulose could be prepared according to the following steps:

(1) washing methylhydroxyethyl cellulose by hot water and then filter it to form a wet filter cake;
(2) dissolving dioctyl sodium sulfosuccinate in water to form a solution;
(3) spraying the solution to the methylhydroxyether cellulose wet filter cake while homogenously mixing the filter cake in a kneader to form granulates;
(4) drying and milling the granules obtained in the above step (3) into powder.

Such obtained powder could be mixed with cement, silica sand and other ingredients to make the hydraulic setting adhesive.

Preferably the surfactant typically is sprayed in an amount of 0.01% or more and can be sprayed in an amount of 1% or more, and at the same time typically is sprayed in an amount of 80% or less and can be sprayed in an amount of 50% or less by weight based on the total weight of the water retention agent.

The inventive hydraulic setting adhesive can be used for laying natural stone tiles or ceramic stoneware. Compared with the adhesives in the prior art, the inventive hydraulic setting adhesive exhibits excellent processing properties, such as easy applying, long open time, low impact on setting retardation, and very good physical properties, especially failure pattern and tensile bond strengths. It is also found that the inventive hydraulic setting adhesive tends to be far less prone to efflorescence.

EXAMPLES

Example 1

A comparison was made to test the effect of the sulfoalkylester surfactant on open time and other properties. Meeting requirements of a cement based tile adhesive of class C1E according to EN 12004, two hydraulic setting adhesives were formulated as below.

Comparative Composition I:
a) Portland cement CEM I 42.5 R (Holcim (Deutschland) AG, Germany), 35.00%
b) F32 silica sand (Quarzwerke GmbH, Germany) having a particle size of 0.125 to 0.5 mm, 32.3%
c) Quartz sand F36 (Quarzwerke GmbH, Germany) having a particle size of 0.09 to 0.25 mm, 31.3%
d) Redispersible polymer powder DLP 2000 brand copolymer based on vinyl acetate-ethylene (Dow Wolff Cellulosics, Germany), 1%
e) Water retention agent WALOCEL™ MW 40000 PFV brand methylhydroxyethyl cellulose, available from Dow Wolff Cellulosics, Germany (WALOCEL is a trademark of The Dow Chemical Company), 0.4%
f) Mixing water 220 g/kg of the dry hydraulic setting adhesive to achieve a consistency of 670±60 Pa·s (Brookfield, 5 rpm, 23° C.)

Inventive Composition II:
a) Portland cement CEM I 42.5 R (Holcim (Deutschland) AG, Germany), 35.00%
b) Silica sand F32 (Quarzwerke GmbH, Germany) having a particle size of 0.125 to 0.5 mm, 32.3%
c) Silica sand F36 (Quarzwerke GmbH, Germany) having a particle size of 0.09 to 0.25 mm,=31.25%
d) Redispersible polymer powder DLP 2000 brand copolymer based on vinyl acetate-ethylene (Dow Wolff Cellulosics, Germany), 1%
e) Water retention agent WALOCEL™ MW 40000 PFV brand methylhydroxyethyl cellulose (Dow Wolff Cellulosics, Germany), 0.4%
f) Surfactant sodium 1,4-bis(2-ethylhexoxy)-1,4-dioxobutane-2-sulfonate (Sigma Aldrich, Germany), 0.05%
g) Mixing water 245 g/kg of the dry hydraulic setting adhesive to achieve a consistency of 670±60 Pa·s (Brookfield, 5 rpm, 23° C.)

TABLE 1

Results of the comparison Tests

| Formulation No. | | I | II |
|---|---|---|---|
| Setting Time(min, Vicat-needle Test) | Initial | 760 | 788 |
| | Final | 861 | 861 |
| Adhesion Strength ($N/mm^2$) | After Norm climate conditioning (EN 1348) | 0.95 | 1.38 |
| | After water immersion storage (EN1348) | 0.82 | 0.88 |
| | after frost-thaw cycle conditioning (EN 1348) | 0.79 | 1.09 |
| Open time ($N/mm^2$) | 20 Min (EN 1346) | 0.93 | 1.65 |
| | 30 Min (EN 1346) | 0.62 | 1.19 |

As shown in Table 1, above, addition of the sulfoalkylester surfactant results in longer open time and setting time almost remains the same compared with the comparative composition. At the same time adhesion strengths under Norm climate and water immersion far exceed those of the comparative composition.

Example 2

A comparison test was made to test the effect of the surfactant sulfoalkylester on open time and other properties. Meeting requirements of a cement based tile adhesive of class C2E according to EN 12004, two hydraulic setting adhesives were formulated as below.

Comparative Composition III:
a) Portland cement CEM I 52.5 R (HeidelbergCement AG, Germany) 35.00%
b) Silica sand F 32 (Quarzwerke GmbH, Germany) having a particle size of 0.125 to 0.5 mm, 31.8%
c) Silica sand F 36 (Quarzwerke GmbH, Germany) having a particle size of 0.09 to 0.25 mm, 30.8%
d) Redispersible polymer powder DLP 2000 brand copolymer based on vinyl acetate-ethylene (Dow Wolff Cellulosics, Germany), 2%
e) Water retention agent WALOCEL™ MTW 8000 PF10 brand methylhydroxyethyl cellulose (Dow Wolff Cellulosics, Germany), 0.4%
f) Mixing water 220 g/kg of the dry hydraulic setting adhesive to achieve a consistency of 670±60 Pa·s (Brookfield, 5 rpm, 23° C.)

Inventive Composition IV
a) Portland cement CEM I 52.5 R (HeidelbergCement AG, Germany), 35.00%
b) Silica sand F32 (Quarzwerke GmbH, Germany) having a particle size of 0.125 to 0.5 mm, 31.8%
c) Silica sand F36 (Quarzwerke GmbH, Germany) having a particle size of 0.09 to 0.25 mm, 30.6%
d) Redispersible polymer powder DLP 2000 brand copolymer based on vinyl acetate-ethylene (Dow Wolff Cellulosics, Germany), 2%
e) Water retention agent WALOCEL™ MTW 8000 PF10 brand methylhydroxyethyl cellulose (Dow Wolff Cellulosics, Germany), 0.4%
f) Surfactant sodium 1,4-bis(2-ethylhexoxy)-1,4-dioxobutane-2-sulfonate (Sigma Aldrich, Germany), 0.2%
g) Mixing water 220 g/kg of the dry hydraulic setting adhesive to achieve a consistency of 670±60 Pa·s (Brookfield, 5 rpm, 23° C.)

As shown in Table 2, below, addition of the sulfoalkylester surfactant results in longer open time and shorter setting time compared with the comparative composition. At the same time, adhesion strength is not impacted; instead adhesion strengths under different conditions are greatly improved.

TABLE 2

Result of the comparison Tests

| Formulation No. | | III | IV |
|---|---|---|---|
| Setting Time(min, Vicat-needle Test) | Initial | 821 | 739 |
| | Final | 901 | 820 |
| Adhesion Strength (N/mm$^2$) | After Norm climate conditioning (EN 1348) | 1.04 | 1.41 |
| | After water immersion storage (EN1348) | 1.45 | 1.93 |
| | after heat conditioning (EN 1348) | 0.22 | 1.45 |
| Open time (N/mm$^2$) | 20 Min (EN 1346) | 0.91 | 1.25 |
| | 30 Min (EN 1346) | 0.68 | 1.20 |

Example 3

A comparison test was designed to test the effect of the surfactant sulfoalkylester on open time and other properties. Two hydraulic setting adhesives meeting requirements of a cement based tile adhesive of class C2E according to EN 12004 were formulated as below.

Comparative Composition V
a) Portland cement CEM I 52.5 R (HeidelbergCement AG, Germany), 35.00%
b) Silica sand F32 (Quarzwerke GmbH, Germany) having a particle size of 0.125 to 0.5 mm, 30.8%
c) Silica sand F36 (Quarzwerke GmbH, Germany) having a particle size of 0.09 to 0.25 mm, 30.8%
d) Redispersible polymer powder DLP 2000 brand copolymer based on vinyl acetate-ethylene (Dow Wolff Cellulosics, Germany), 2.5%
e) Water retention agent METHOCEL™ A4M brand methylcellulose, available from Dow Wolff Cellulosics, Germany (METHOCEL is a trademark of THE DOW CHEMICAL COMPANY), 0.4%
f) Accelerator Mebofix 50 brand calcium formate (LANXESS AG, Germany), 0.5%
g) Mixing water 220 g/kg of the dry hydraulic setting adhesive to achieve a consistency of 670±60 Pa·s (Brookfield, 5 rpm, 23° C.)

Inventive Composition VI
a) Portland cement CEM I 52.5 R (HeidelbergCement AG, Germany), 35.00%
b) Silica sand F32 (Quarzwerke GmbH, Germany) having a particle size of 0.125 to 0.5 mm, 30.8%
c) Silica sand F36 (Quarzwerke GmbH, Germany) having a particle size of 0.09 to 0.25 mm, 30.76%
d) Redispersible polymer powder DLP 2000 brand copolymer based on vinyl acetate-ethylene (available from Dow Wolff Cellulosics, Germany), 2.5%
e) Water retention agent METHOCEL™ A4M brand methylcellulose (Dow Wolff Cellulosics, Germany), 0.4%
f) Accelerator Mebofix 50 brand calcium formate (LANXESS AG, Germany), 0.5%
g) Surfactant sodium 1,4-bis(2-ethylhexoxy)-1,4-dioxobutane-2-sulfonate (Sigma Aldrich, Germany), 0.04%
h) Mixing water 205 g/kg of the dry hydraulic setting adhesive to achieve a consistency of 670±60 Pa·s (Brookfield, 5 rpm, 23° C.)

TABLE 3

Result of the comparison Tests

| Formulation No. | | V | VI |
|---|---|---|---|
| Setting Time(min, Vicat-needle Test) | Initial | 272 | 276 |
| | Final | 339 | 325 |
| Adhesion Strength (N/mm$^2$) | After Norm climate conditioning (EN 1348) | 1.17 | 1.21 |
| | After water immersion storage (EN1348) | 1.23 | 1.42 |
| | after heat conditioning (EN 1348) | 1.52 | 2.17 |
| Open time (N/mm$^2$) | 20 Min (EN 1346) | 1.04 | 1.71 |
| | 30 Min (EN 1346) | 0.49 | 1.04 |

As shown in Table 3, above, addition of the sulfoalkylester surfactant results in longer open time and setting time almost keeps the same compared with the comparative composition. At the same time, adhesion strengths under different conditions are greatly improved.

Example 4

Comparison Test of Surfactant and Retarders

A comparison test was conducted between the inventive compositions comprising surfactant sodium 1,4-bis(2-ethylhexoxy)-1,4-dioxobutane-2-sulfonate and comparative compositions comprising retarders sodium-tartaric acid salt or tri-sodium-citric acid salt. The percentage of Silica sand type F36 was adjusted according to different additions of the Co-additive and therefore the total percentage of all ingredients achieves 100%.

The ingredients including the surfactant/retarder are as below:

a) 35.0% Ordinary Portland Cement CEM I 52.5 R (Milke, Germany);

acid salt (retarder, Aldrich) (comparative formulations) at the concentrations indicated in Table 4.

As shown in Table 4, below, the comparative retarders result in very long setting time. The sulfoalkylester surfactant achieves longer open time and setting time almost remains the same or even shorter compared with the comparative compositions. At the same time, the adhesion strengths of the inventive hydraulic setting adhesive No. 8 are higher than the comparative formulations and the Standard under all conditions.

TABLE 4

Effect of retarders/surfactant on Open Time and other properties

| | Formulation No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Comment | Standard | *Invent. | Invent. | Invent. | **Comp. | Comp. | Invent. | Invent. | Comp. | Comp. | Comp. | Comp. |
| Dosage Co-additive a [%] | 0 | 0.025 | 0.0125 | 0.05 | 0 | 0 | 0.10 | 0.20 | 0 | 0 | 0 | 0 |
| Dosage Co-additive b [%] | 0 | 0 | 0 | 0 | 0.05 | 0 | 0 | 0 | 0.10 | 0.20 | 0 | 0 |
| Dosage Co-additive c [%] | 0 | 0 | 0 | 0 | 0 | 0.05 | 0 | 0 | 0 | 0 | 0.10 | 0.20 |
| water-solid ratio | 0.22 | 0.22 | 0.22 | 0.22 | 0.22 | 0.22 | 0.22 | 0.22 | 0.22 | 0.22 | 0.22 | 0.22 |
| Initial setting time [min.] | 821 | 758 | 798 | 698 | 969 | 1089 | 637 | 739 | 1641 | 1576 | 1707 | 3116 |
| Final setting time [min] | 901 | 817 | 870 | 786 | 1051 | 1159 | 720 | 820 | 1669 | 1999 | 1842 | 3143 |
| Toatal setting time [min.] | 80 | 59 | 72 | 88 | 82 | 70 | 83 | 81 | 28 | 423 | 135 | 27 |
| Adhesion strengths EN 1348 | | | | | [N/mm2] | | | | | | | |
| Norm climate storage [N/mm$^2$] | 1.00 | 0.80 | 0.89 | 0.66 | 0.76 | 0.73 | 0.84 | 1.41 | ***not determ. | not determ. | not determ. | not determ. |
| Water immersion [N/mm$^2$] | 1.45 | 1.62 | 1.73 | 1.29 | 1.40 | 1.36 | 1.52 | 1.93 | not determ. | not determ. | not determ. | not determ. |
| Heat conditioning [N/mm$^2$] | 0.22 | 0.00 | 0.00 | 0.00 | 0.29 | 0.34 | 0.15 | 1.45 | not determ. | not determ. | not determ. | not determ. |
| Open time EN 1346 | | | | | [N/mm2] | | | | | | | |
| adhesion after 20 min [N/mm$^2$] | 0.91 | 0.91 | 0.91 | 0.55 | 0.56 | 1.00 | 1.34 | 1.41 | not determ. | not determ. | not determ. | not determ. |
| adhesion after 30 min [N/mm$^2$] | 0.68 | 0.70 | 0.56 | 0.24 | 0.17 | 0.43 | 0.46 | 1.41 | not determ. | not determ. | not determ. | not determ. |

*Invent.: Inventive Formulation.
**Comp.: Comparative Formulation.
***not determ.: Not determined.

b) 31.8% Silica sand type F32 (Quarzwerke Frechen, Germany);
c) 30.6%-30.8% Silica sand type F36 (Quarzwerke Frechen, Germany);
d) 2.0% Redispersible Powder DLP 2000 brand copolymer based on vinyl acetate-ethylene (available from Dow Wolff Cellulosics, Germany);
e) 0.4% WALOCEL™ MTW 8000 PF 10 brand methyl-hydroxyethyl cellulose (Dow Wolff Cellulosics, Germany); and
f) Co-additive a=Dioctylsulfosuccinat (surfactant, Aldrich) (inventive formulations) at the concentrations indicated in Table 4,
Co-additive b=Sodium-tartaric acid salt (retarder, Aldrich) (comparative formulations) at the concentrations indicated in Table 4, or Co-additive c=Tri-Sodium-citric

The invention claimed is:

1. A hydraulic setting adhesive comprising the following ingredients:
   a) a hydraulic binder,
   b) one or more filler,
   c) one or more water retention agent, and
   d) one or more sulfoalkylester surfactant,
   wherein said sulfoalkylester surfactant has the following formula:

$$MSO_3\text{—}R^1\text{—}(\text{—}COOR^2)_n,$$

wherein M is selected from the group consisting of hydrogen, alkali metals, alkaline earth metals, and ammonium;
   $R^1$ is linear or branched, saturated or unsaturated $C_1$-$C_{10}$ alkylene that optionally can be substituted by one or more hydroxyl, halogen, nitro or cyano groups;

$R^2$ can be identical or different from $R^1$ and is represented by $C_1$-$C_{22}$ linear or branched alkyl; and n is an integer from 1 to 10, and wherein said hydraulic setting adhesive comprises 0.1-3% by weight of said water retention agent, based on its total dry weight.

2. The hydraulic setting adhesive according to claim 1, wherein the sulfoalkylester surfactant is a dialkylester sulfonate.

3. The hydraulic setting adhesive according to claim 1, wherein the sulfoalkylester surfactant is sodium 1,4-bis(2-ethylhexoxy)-1,4-dioxobutane-2-sulfonate.

4. The hydraulic setting adhesive according to claim 1, wherein the water retention agent is cellulose ether, starch ether, or a combination of both.

5. The hydraulic setting adhesive according to claim 1, further comprising
 e) redispersible polymer powder, polymer dispersion, or a combination of both.

6. The hydraulic setting adhesive according to claim 1, wherein the hydraulic setting adhesive based on its dry weight comprises 0.15 to 1.5% by weight of said water retention agent, and 0.02 to 0.4% by weight of the sulfoalkylester surfactant.

7. The hydraulic setting adhesive according to claim 5, the hydraulic setting adhesive based on its dry weight comprising
 a) 20 to 45% by weight of the hydraulic binder,
 b) 50 to 70% by weight of the filler,
 c) 0.2 to 1% by weight of the water retention agent,
 d) 0.5 to 5% by weight of the redispersible polymer powder or polymer dispersion, as solids, and
 e) 0.06 to 0.3% by weight of the sulfoalkylester surfactant.

8. A process for producing said hydraulic setting adhesive according to claim 1, comprising
 a) classifying the ingredients into dry ingredients and liquid ingredients,
 b) formulating the sulfoalkylester surfactant into a solution and applying said solution on the water retention agent to form granules,
 c) mixing the water retention agent granules with other dry ingredients, and
 d) adding the liquid components directly before mixing with water.

* * * * *